April 9, 1929. C. W. BENNETT Re. 17,259

TOOL HOLDER

Original Filed April 17, 1926

INVENTOR:
CLAUDE W. BENNETT,
BY Ford W. Harris
ATTORNEY.

Reissued Apr. 9, 1929. Re. 17,259

UNITED STATES PATENT OFFICE.

CLAUDE W. BENNETT, OF WHITTIER, CALIFORNIA.

TOOL HOLDER.

Original No. 1,601,669, dated September 28, 1926, Serial No. 102,727, filed April 17, 1926. Application for reissue filed March 28, 1927. Serial No. 179,170.

This invention relates to tool holders or bars for lathes and has for an important object thereof the provision of a device in the use of which exchange of tools is facilitated.

A further and more specific object of the invention is to provide a device of this character having controlling tappets, one of which may be struck with a hammer to tighten the tool in position and the other of which may be struck to release the tool, the structure being such that tools of different sizes or widths may be accommodated.

These and other objects I attain by the construction shown in the accompanying drawing, wherein for the purpose of illustration is shown a preferred embodiment of my invention and wherein.

Figure 1:
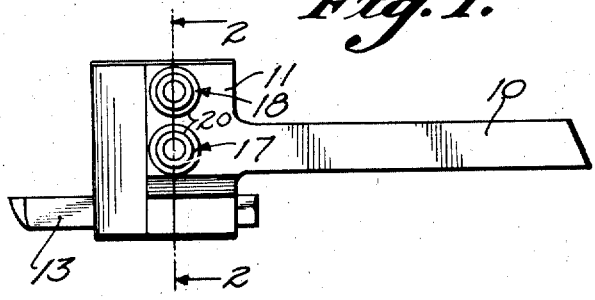
Fig. 1 is a plan view of a tool holder constructed in accordance with my invention.
Figure 2:
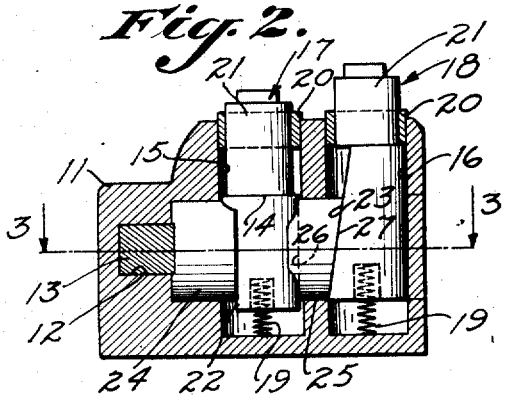
Fig. 2 is a section on the line 2—2 of Fig. 1.
Figure 3:
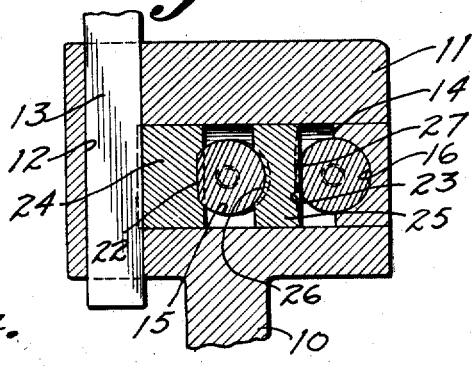
Fig. 3 is a section on the line 3—3 of Fig. 2.
Figure 4:
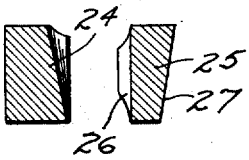
Fig. 4 is a combined vertical sectional view taken through the wedge blocks.

Referring now more particularly to the drawing, the numeral 10 generally designates a tool bar having a head 11 provided with an opening 12 for the passage of a tool 13. The head is formed with a transverse bore 14 partially intercepting the tool receiving opening 12 and this bore is in turn intersected by vertical bores 15 and 16 opening through the upper end of the head 11.

Arranged within the bores 15 and 16 respectively are plungers 17 and 18, each urged upwardly by a spring 19 and each limited in its upward movement by a collar 20 surrounding a reduced upper end portion 21 of the plunger. The plunger 17 has that face thereof next adjacent the tool opening 12 beveled downwardly, as indicated at 22 while the corresponding face of the plunger 18 is beveled upwardly, as indicated at 23. At the inner end of the bore 14 is arranged a wedge block 24, one face of which is shaped to engage the tool 13 while the opposite face thereof is beveled for coaction with the beveled face 22 of the plunger 17. In that portion of the bore 14 lying between the vertical bores 15 and 16 is positioned a wedge block 25 having one face thereof arcuately curved, as at 26, for engagement with the plunger 17 and the opposite face thereof beveled, as at 27, for engagement with the beveled face 23 of the plunger 18.

In the use of the device, the tool 13 is inserted in the opening 12 and tightened by tapping the upper end of the plunger 17 with a hammer or the like. This tapping forces the plunger 17 downwardly and accordingly causes the wedge block 24 to move into engagement with the side face of the tool. When it is desired to loosen the tool for removal or adjustment, the upper end of the plunger 18 is tapped with a hammer, permitting the wedge block 25 to move longitudinally and free the plunger 17 so that it moves upwardly under the influence of its spring and permits the wedge block 24 to shift to the releasing position.

It will be obvious that a device of this character may be very readily and cheaply produced and will provide an effective means for rapidly inserting or removing a tool in the holder. It will also be obvious that the structure thereof is capable of a certain range of change and modification without materially departing from the spirit of the invention and I accordingly do not limit myself to such specific structure except as hereinafter claimed.

I claim as my invention:

1. In a tool holder for lathes, a tool bar having a head provided with a tool receiving opening and having a bore partially intercepting the tool receiving opening, a tool contacting wedge block arranged within the bore, a tappet having one face coacting with the wedge block and normally spring urged to a position releasing the wedge block from engagement with the tool, a member movable longitudinally of the bore engaging the opposite face of the tappet, and means normally preventing movement of the member longitudinally of the bore in a direction away from the tappet and urging the member into engagement with the tappet.

2. In a tool holder for lathes, a tool bar having a head provided with a tool receiving opening and having a bore partially intercepting the tool receiving opening, a tool contacting wedge block arranged within the bore, a tappet having one face coacting with the wedge block and normally spring urged to a position releasing the wedge block from engagement with the tool, a member movable longitudinally of the bore engaging the opposite face of the tappet, and means normally preventing movement of the member longitudinally of the bore in a direction away from the tappet comprising a second tappet having a wedging engagement with said member.

3. In a tool holder for lathes, a tool bar having a head provided with a tool receiving opening and having a bore partially intercepting the tool receiving opening, a tool contacting wedge block arranged within the bore, a tappet having one face coacting with the wedge block and normally spring urged to a position releasing the wedge block from engagement with the tool, a member movable longitudinally of the bore engaging the opposite face of the tappet, means normally preventing movement of the member longitudinally of the bore in a direction away from the tappet comprising a second tappet having a wedging engagement with said member, and a spring normally urging the second tappet in a direction shifting the member toward the first named tappet.

4. In a tool holder for lathes, a tool bar having a head provided with a tool receiving opening and having a bore partially intercepting the tool receiving opening, a tool contacting wedge block arranged within the bore, a tappet having one face coacting with the wedge block and normally spring urged to a position releasing the wedge block from engagement with the tool, a member movable longitudinally of the bore engaging the opposite face of the tappet, means normally preventing movement of the member longitudinally of the bore in a direction away from the tappet comprising a second tappet having a wedging engagement with said member, and a spring normally urging the second tappet in a direction shifting the member toward the first named tappet, the heads of said tappets being disposed at one side of the head of the bar to permit engagement therewith of an impact tool.

5. A locking device for clamping a primary member to a secondary member, comprising: a clamping wedge movable in said primary member, the pressure exerted by one side of said clamping wedge being directed against said secondary member in such a manner as to frictionally bind same; a releasing wedge through which the pressure exerted by the other side of said clamping wedge is exerted against said primary member, said releasing wedge being operable to release said clamping wedge and relieve the pressure directed against said secondary member; and a pressure transmitting block situated between said clamping wedge and said releasing wedge and so mounted in said primary member that it is free to move substantially along the line of pressure which it transmits from one of said wedges to the other.

6. A locking device for clamping a primary member to a secondary member, comprising: a clamping wedge movable in said primary member, the pressure exerted by one side of said clamping wedge being directed against said secondary member in such a manner as to frictionally bind same; a spring acting against said clamping wedge in such a manner as to tend to move it out of its operative position, said spring being of insufficient strength to so move said clamping wedge when full pressure is being exerted thereby; a releasing wedge through which the pressure exerted by the other side of said clamping wedge is exerted against said primary member, said releasing wedge being operable to release said clamping wedge and relieve the pressure directed against said secondary member; and a pressure transmitting block situated between said clamping wedge and said releasing wedge and so mounted in said primary member that it is free to move substantially along the line of pressure which it transmits from one of said wedges to the other.

7. A locking device for clamping a primary member to a secondary member, comprising: a clamping wedge movable in said primary member, the pressure exerted by one side of said clamping wedge being directed against said secondary member in such a manner as to frictionally bind same; a releasing wedge through which the pressure exerted by the other side of said clamping wedge is exerted against said primary member, said releasing wedge being operable to release said clamping wedge and relieve the pressure directed against said secondary member; a spring acting against said releasing wedge and tending to move it into a position to assume said pressure; and a pressure transmitting block situated between said clamping wedge and said releasing wedge and so mounted in said primary member that it is free to move substantially along the line of pressure which it transmits from one of said wedges to the other.

8. A locking device for clamping a primary member to a secondary member, comprising: a clamping wedge movable in said primary member, the pressure exerted by one side of said clamping wedge being directed against said secondary member in such a manner as to frictionally bind same; a spring acting against said clamping wedge in such a manner as to tend to move it out of its operative position, said spring being of insufficient strength to so move said clamping wedge when full pressure is being exerted thereby; a releasing wedge through which the pressure exerted by the other side of said clamping wedge is exerted against said primary member, said releasing wedge being operable to release said clamping wedge and relieve the pressure directed against said secondary member; a spring acting against said releasing wedge and tending to move it into a position to assume said pressure; and a pressure transmitting block situated between said clamping wedge and said releasing wedge and so mounted in said primary member that it is free to move substantially along the line of pressure which it transmits from one of said wedges to the other.

9. A locking device for clamping a primary member to a secondary member, comprising: a clamping wedge movable in said primary member; a wedge block acted upon by one side of said wedge to apply pressure to said secondary member, said wedge block being so mounted in said primary member that it is constrained to move substantially along the line of said pressure; and a backing means against which the pressure exerted by the other side of said clamping wedge is directed, said backing means being operable to release said clamping wedge and relieve the pressure directed against said secondary member.

10. A locking device for clamping a primary member to a secondary member, comprising: a clamping wedge movable in said primary member; a wedge block acted upon by one side of said wedge to apply pressure to said secondary member, said wedge block being so mounted in said primary member that it is constrained to move substantially along the line of said pressure; a spring acting against said clamping wedge in such a manner as to tend to move it out of its operative position, said spring being of insufficient strength to so move said clamping wedge when full pressure is being exerted thereby; and a backing means against which the pressure exerted by the other side of said clamping wedge is directed, said backing means being operable to release said clamping wedge and relieve the pressure directed against said secondary member.

11. A locking device for clamping a primary member to a secondary member, comprising: a clamping wedge movable in said primary member; a wedge block acted upon by one side of said wedge to apply pressure to said secondary member, said wedge block being so mounted in said primary member that it is constrained to move substantially along the line of said pressure; a spring acting against said clamping wedge in such a manner as to tend to move it out of its operative position, said spring being of insufficient strength to so move said clamping wedge when full pressure is being exerted thereby; and a releasing wedge through which the pressure exerted by the other side of said clamping wedge is exerted against said primary member, said releasing wedge being operable to release said clamping wedge and relieve the pressure directed against said secondary member.

12. A locking device for clamping a primary member to a secondary member, comprising: a clamping wedge movable in said primary member; a wedge block acted upon by one side of said wedge to apply pressure to said secondary member, said wedge block being so mounted in said primary member that it is constrained to move substantially along the line of said pressure; a releasing wedge through which the pressure exerted by the other side of said clamping wedge is exerted against said primary member, said releasing wedge being operable to release said clamping wedge and relieve the pressure directed against said secondary member; and a spring acting against said releasing wedge and tending to move it into a position to assume said pressure.

13. A locking device for clamping a primary member to a secondary member, comprising: a clamping wedge movable in said primary member; a wedge block acted upon by one side of said wedge to apply pressure to said secondary member, said wedge block being so mounted in said primary member that it is constrained to move substantially along the line of said pressure; a spring acting against said clamping wedge in such a manner as to tend to move it out of its operative position, said spring being of insufficient strength to so move said clamping wedge when full pressure is being exerted thereby; a releasing wedge through which the pressure exerted by the other side of said clamping wedge is exerted against said primary member, said releasing wedge being operable to release said clamping wedge and relieve the pressure directed against said secondary member; and a spring acting against said releasing wedge and tending to move it into a position to assume said pressure.

14. A locking device for clamping a primary member to a secondary member, comprising: a clamping wedge movable in said primary member; a wedge block acted upon by one side of said wedge to apply pressure to said secondary member, said wedge block being so mounted in said primary member that it is constrained to move substantially along the line of said pressure; a releasing wedge through which the pressure exerted by the other side of said clamping wedge is exerted against said primary member, said releasing wedge being operable to release said clamping wedge and relieve the pressure directed against said secondary member; and a pressure transmitting block situated between said clamping wedge and said releasing wedge and so mounted in said primary member that it is free to move substantially along the line of pressure which it transmits from one of said wedges to the other.

15. A locking device for clamping a primary member to a secondary member, comprising: a clamping wedge movable in said primary member; a wedge block acted upon by one side of said wedge to apply pressure to said secondary member, said wedge block being so mounted in said primary member that it is constrained to move substantially along the line of said pressure; a spring acting against said clamping wedge in such a manner as to tend to move it out of its operative position, said spring being of insufficient strength to so move said clamping wedge when full pressure is being exerted thereby; a releasing wedge through which the pressure exerted by the other side of said clamping wedge is exerted against said primary member, said releasing wedge being operable to release said clamping wedge and relieve the pressure directed against said secondary member; and a pressure transmitting block situated between said clamping wedge and said releasing wedge and so mounted in said primary member that it is free to move substantially along the line of pressure which it transmits from one of said wedges to the other.

16. A locking device for clamping a primary member to a secondary member, comprising: a clamping wedge movable in said primary member; a wedge block acted upon by one side of said wedge to apply pressure to said secondary member, said wedge block being so mounted in said primary member that it is constrained to move substantially along the line of said pressure; a releasing wedge through which the pressure exerted by the other side of said clamping wedge is exerted against said primary member, said releasing wedge being operable to release said clamping wedge and relieve the pressure directed against said secondary member; a spring acting against said releasing wedge and tending to move it into a position to assume said pressure; and a pressure transmitting block situated between said clamping wedge and said releasing wedge and so mounted in said primary member that it is free to move substantially along the line of pressure which it transmits from one of said wedges to the other.

17. A locking device for clamping a primary member to a secondary member, comprising: a clamping wedge movable in said primary member; a wedge block acted upon by one side of said wedge to apply pressure to said secondary member, said wedge block being so mounted in said primary member that it is constrained to move substantially along the line of said pressure; a spring acting against said clamping wedge in such a manner as to tend to move it out of its operative position, said spring being of insufficient strength to so move said clamping wedge when full pressure is being exerted thereby; a releasing wedge through which the pressure exerted by the other side of said clamping wedge is exerted against said primary member, said releasing wedge being operable to release said clamping wedge and relieve the pressure directed against said secondary member; a spring acting against said releasing wedge and tending to move it into a position to assume said pressure; and a pressure transmitting block situated between said clamping wedge and said releasing wedge and so mounted in said primary member that it is free to move substantially along the line of pressure which it transmits from one of said wedges to the other.

18. A locking device for clamping a primary member to a secondary member, comprising: a clamping wedge movable in said primary member, the pressure exerted by one side of said clamping wedge being directed against said secondary member in such a manner as to frictionally bind same; and means against which is directed the pressure exerted by the other side of said clamping wedge, said means being operable to release said clamping wedge and relieve the pressure directed against said secondary member, said means and said clamping wedge being held in said primary member when in releasing position.

In testimony whereof, I have hereunto subscribed my name at Los Angeles, California, on the 18th day of March, 1927.

CLAUDE W. BENNETT.